United States Patent
Sun

(10) Patent No.: US 12,533,378 B2
(45) Date of Patent: Jan. 27, 2026

(54) TREATMENT OF ADVERSE EFFECTS CAUSED BY ATYPICAL ANTIPSYCHOTICS

(71) Applicant: SHENZHEN PROFOUND VIEW PHARMACEUTICAL TECHNOLOGY CO., LTD., Shenzhen (CN)

(72) Inventor: Taolei Sun, Wuhan (CN)

(73) Assignee: SHENZHEN PROFOUND VIEW PHARMACEUTICAL TECHNOLOGY CO., LTD., Shenzhen (CN)

( * ) Notice: Subject to any disclaimer, the term of this patent is extended or adjusted under 35 U.S.C. 154(b) by 618 days.

(21) Appl. No.: 17/995,581

(22) PCT Filed: May 10, 2020

(86) PCT No.: PCT/CN2020/089320
§ 371 (c)(1),
(2) Date: Oct. 5, 2022

(87) PCT Pub. No.: WO2021/226736
PCT Pub. Date: Nov. 18, 2021

(65) Prior Publication Data
US 2023/0158065 A1 May 25, 2023

(51) Int. Cl.
| | |
|---|---|
| *A61K 33/242* | (2019.01) |
| *A61K 47/69* | (2017.01) |
| *A61P 3/04* | (2006.01) |
| *B82Y 5/00* | (2011.01) |

(52) U.S. Cl.
CPC ........ *A61K 33/242* (2019.01); *A61K 47/6929* (2017.08); *A61P 3/04* (2018.01); *B82Y 5/00* (2013.01)

(58) Field of Classification Search
CPC ..... A61K 33/242; A61K 47/6929; A61P 3/04; B82Y 5/00
See application file for complete search history.

(56) References Cited

U.S. PATENT DOCUMENTS

| 2003/0096808 A1 | 5/2003 | Miller |
| 2019/0030069 A1 | 1/2019 | Sun |

FOREIGN PATENT DOCUMENTS

| EP | 3545948 | 10/2019 |
| WO | 2009059418 | 5/2009 |
| WO | WO 2009/059418 A1 | 5/2009 |
| WO | WO 2011/011238 A1 | 1/2011 |
| WO | 2012016879 | 2/2012 |

OTHER PUBLICATIONS

Gautier et al. JACS (2006), 128, 11079-11087.*
Divac et al. (BioMed Research International 2014 article ID 656370 6 pages).*
Gao et al. (2019) Gold nanoclusters for Parkinson's disease treatment. 194: 36-46.
Majouga et al. (2010) New separation materials based on gold nanoparticles. Journal of Manufacturing technology management. 21: 950-955.
Melkersson et al. (2004) Adverse metabolic effects associated with atypical antipsychotics. Drugs. 64: 701-723.
Petronilho et al. (2019) Gold nanoparticles potentiates N-acetylcysteine effects on neurochemicals alterations in rats after polymicrobial sepsis. Journal of Drug Targeting. 28: 428-436.
Salamon et al. (2019) Medical and dietary uses of N-acetylcysteine. Antioxidants. 8: 111.
Zhang et al. (2012) Amyloid-b Induces Hepatic Insulin Resistance by Activating JAK2/STAT3/SOCS-1 Signaling Pathway. Diabetes. 61: 1434-1443.
Lian et al. Preventing Olanzapine-induced weight gain using betahistine: a study in a rat model with chronic olanzapine treatment. PLoS One. 2014, 9(8): e104160.
W. Yan, L. Xu, C. Xu, W. Ma, H. Kuang, L. Wang and N. A. Kotov, Journal of the American Chemical Society 2012, 134, 15114.
X. Yuan, B. Zhang, Z. Luo, Q. Yao, D. T. Leong, N. Yan and J. Xie, Angewandte Chemie International Edition 2014, 53, 4623.

* cited by examiner

*Primary Examiner* — Shirley V Gembeh

(74) *Attorney, Agent, or Firm* — Yihe Intellectual Property Services Co. Ltd; George Liu

(57) ABSTRACT

Ligand-bound gold clusters and compositions comprising the ligand-bound gold clusters are used for treating adverse effects caused by atypical antipsychotics and manufacturing a medicament for treatment of adverse effects caused by atypical antipsychotics. Methods for treating adverse effects caused by atypical antipsychotics.

9 Claims, 12 Drawing Sheets

TREATMENT OF ADVERSE EFFECTS CAUSED BY ATYPICAL ANTIPSYCHOTICS

FIELD OF THE INVENTION

The present invention relates to the technical field of antipsychotic medications, particularly to ligand-bound gold clusters (AuCs), composition comprising the ligand-bound AuCs, and methods employing the ligand-bound AuCs and composition for preventing, inhibiting, reducing and/or reversing adverse effects caused by a typical antipsychotic.

BACKGROUND OF THE INVENTION

Atypical antipsychotics are second-generation antipsychotics that are currently used to treat a variety of psychiatric conditions including schizophrenia, bipolar disorder, depression, and autism. Despite their documented efficacy and low risks for extrapyramidal symptoms, atypical antipsychotics are commonly associated with various adverse effects including obesity characterized by excessive bodyweight gain, lipid metabolism disorder, and glucose metabolism disorder. Patients taking for example olanzapine or clozapine have the highest risk to experience bodyweight gain. The rapid progression of body weight gain suggests a distinct etiology underlying the atypical antipsychotics-induced metabolic syndrome.

Unfortunately, the mechanisms underlying the various adverse effects such as body weight gain and metabolic disorders caused by the second generation atypical antipsychotics remain largely unknown despite extensive researches have been carried out.

Olanzapine has high binding affinities with multiple neurotransmitter receptors including dopamine $D_2$, serotonin 5-$HT_{2A}$ and 5-$HT_{2C}$, histamine $H_1$ receptors, and muscarinic $M_1$ and $M_3$ receptors. Numerous pharmacological adjunctive treatments have been tried to counteract olanzapine-induced weight gain. For example, co-treatment of olanzapine and betahistine (an $H_1R$ agonist and $H_3R$ antagonist) significantly reduced weight gain induced by olanzapine (Lian et al. Preventing Olanzapine-induced weight gain using betahistine: a study in a rat model with chronic olanzapine treatment. *PLoS One*. 2014, 9(8): e104160). Additional examples include muscarinic acetylcholine receptor $M_1$ subtype antagonist telenzepine for treatment of olanzapine-induced weight gain (WO 2011/011238 A1), dopamine agonist pramipexole for preventing or reducing weight gain and associated metabolic syndrome in patients receiving atypical antipsychotic drugs including clozapine, olanzapine, quetiapine and risperidone (WO 2009/059418 A1), and the histamine $H_2$-receptor antagonists selected from the group consisting of nizatidine, famoditine, cimetidine and ranitidine (US 2003/0096808 A1). However, the results with those agonists or antagonists are inconclusive or contradictory.

There remains a need for better strategies to counteract the adverse effects caused by the second generation antipsychotic drugs such as olanzapine and clozapine.

SUMMARY OF THE INVENTION

The present invention provides the use of ligand-bound gold clusters to treat the adverse effects caused by an atypical antipsychotic in a subject, the method of treating the adverse effects caused by an atypical antipsychotic in a subject with ligand-bound gold clusters, and the use of ligand-bound gold clusters for manufacture of medicament for treatment of the adverse effects caused by an atypical antipsychotic in a subject.

Certain embodiments of the present invention use of a ligand-bound gold cluster to treat the adverse effects caused by an atypical antipsychotic in a subject, wherein the ligand-bound gold cluster comprises a gold core; and a ligand bound to the gold core. In certain embodiments, the atypical antipsychotic is one selected from the group consisting of olanzapine, clozapine, risperidone, and quetiapine.

In certain embodiments of the treatment use, the gold core has a diameter in the range of 0.5-3 nm. In certain embodiments, the gold core has a diameter in the range of 0.5-2.6 nm.

In certain embodiments of the treatment use, the ligand is one selected from the group consisting of L-cysteine and its derivatives, D-cysteine and its derivatives, cysteine-containing oligopeptides and their derivatives, and other thiol-containing compounds.

In certain embodiments of the treatment use, the L-cysteine and its derivatives are selected from the group consisting of L-cysteine, N-isobutyryl-L-cysteine (L-NIBC), and N-acetyl-L-cysteine (L-NAC), and the D-cysteine and its derivatives are selected from the group consisting of D-cysteine, N-isobutyryl-D-cysteine (D-NIBC), and N-acetyl-D-cysteine (D-NAC).

In certain embodiments of the treatment use, the cysteine-containing oligopeptides and their derivatives are cysteine-containing dipeptides, cysteine-containing tripeptides or cysteine-containing tetrapeptides.

In certain embodiments of the treatment use, the cysteine-containing dipeptides are selected from the group consisting of L(D)-cysteine-L(D)-arginine dipeptide (CR), L(D)-arginine-L(D)-cysteine dipeptide (RC), L(D)-histidine-L(D)-cysteine dipeptide (HC), and L(D)-cysteine-L(D)-histidine dipeptide (CH).

In certain embodiments of the treatment use, the cysteine-containing tripeptides are selected from the group consisting of glycine-L(D)-cysteine-L(D)-arginine tripeptide (GCR), L(D)-proline-L(D)-cysteine-L(D)-arginine tripeptide (PCR), L(D)-lysine-L(D)-cysteine-L(D)-proline tripeptide (KCP), and L(D)-glutathione (GSH).

In certain embodiments of the treatment use, the cysteine-containing tetrapeptides are selected from the group consisting of glycine-L(D)-serine-L(D)-cysteine-L(D)-arginine tetrapeptide (GSCR), and glycine-L(D)-cysteine-L(D)-serine-L(D)-arginine tetrapeptide (GCSR).

In certain embodiments of the treatment use, the other thiol-containing compounds are selected from the group consisting of 1-[(2S)-2-methyl-3-thiol-1-oxopropyl]-L(D)-proline, thioglycollic acid, mercaptoethanol, thiophenol, D-3-trolovol, N-(2-mercaptopropionyl)-glycine, dodecyl mercaptan, 2-aminoethanethiol (CSH), 3-mercaptopropionic acid (MPA), and 4-mercaptobenzoic acid (p-MBA).

Certain embodiments of the present invention use a ligand-bound gold cluster for manufacture of a medicament for the treatment of the adverse effects caused by an atypical antipsychotic in a subject, wherein ligand-bound gold cluster comprises a gold core; and a ligand bound the gold core. In certain embodiments, the atypical antipsychotic is one selected from the group consisting of olanzapine, clozapine, risperidone, and quetiapine.

In certain embodiments of the manufacture use, the gold core has a diameter in the range of 0.5-3 nm. In certain embodiments, the gold core has a diameter in the range of 0.5-2.6 nm.

In certain embodiments of the manufacture use, the ligand is one selected from the group consisting of L-cysteine and its derivatives, D-cysteine and its derivatives, cysteine-containing oligopeptides and their derivatives, and other thiol-containing compounds.

In certain embodiments of the manufacture use, the L-cysteine and its derivatives are selected from the group consisting of L-cysteine, N-isobutyryl-L-cysteine (L-NIBC), and N-acetyl-L-cysteine (L-NAC), and the D-cysteine and its derivatives are selected from the group consisting of D-cysteine, N-isobutyryl-D-cysteine (D-NIBC), and N-acetyl-D-cysteine (D-NAC).

In certain embodiments of the manufacture use, the cysteine-containing oligopeptides and their derivatives are cysteine-containing dipeptides, cysteine-containing tripeptides or cysteine-containing tetrapeptides.

In certain embodiments of the manufacture use, the cysteine-containing dipeptides are selected from the group consisting of L(D)-cysteine-L(D)-arginine dipeptide (CR), L(D)-arginine-L(D)-cysteine dipeptide (RC), L(D)-histidine-L(D)-cysteine dipeptide (HC), and L(D)-cysteine-L(D)-histidine dipeptide (CH).

In certain embodiments of the manufacture use, the cysteine-containing tripeptides are selected from the group consisting of glycine-L(D)-cysteine-L(D)-arginine tripeptide (GCR), L(D)-proline-L(D)-cysteine-L(D)-arginine tripeptide (PCR), L(D)-lysine-L(D)-cysteine-L(D)-proline tripeptide (KCP), and L(D)-glutathione (GSH).

In certain embodiments of the manufacture use, the cysteine-containing tetrapeptides are selected from the group consisting of glycine-L(D)-serine-L(D)-cysteine-L(D)-arginine tetrapeptide (GSCR), and glycine-L(D)-cysteine-L(D)-serine-L(D)-arginine tetrapeptide (GC SR).

In certain embodiments of the manufacture use, the other thiol-containing compounds are selected from the group consisting of 1-[(2S)-2-methyl-3-thiol-1-oxopropyl]-L(D)-proline, thioglycollic acid, mercaptoethanol, thiophenol, D-3-trolovol, N-(2-mercaptopropionyl)-glycine, dodecyl mercaptan, 2-aminoethanethiol (CSH), 3-mercaptopropionic acid (MPA), and 4-mercaptobenoic acid (p-MBA).

The objectives and advantages of the invention will become apparent from the following detailed description of preferred embodiments thereof in connection with the accompanying drawings.

DESCRIPTION OF THE DRAWINGS

Preferred embodiments according to the present invention will now be described with reference to the Figures, in which like reference numerals denote like elements.

DETAILED DESCRIPTION OF THE EMBODIMENTS

Figure 1:
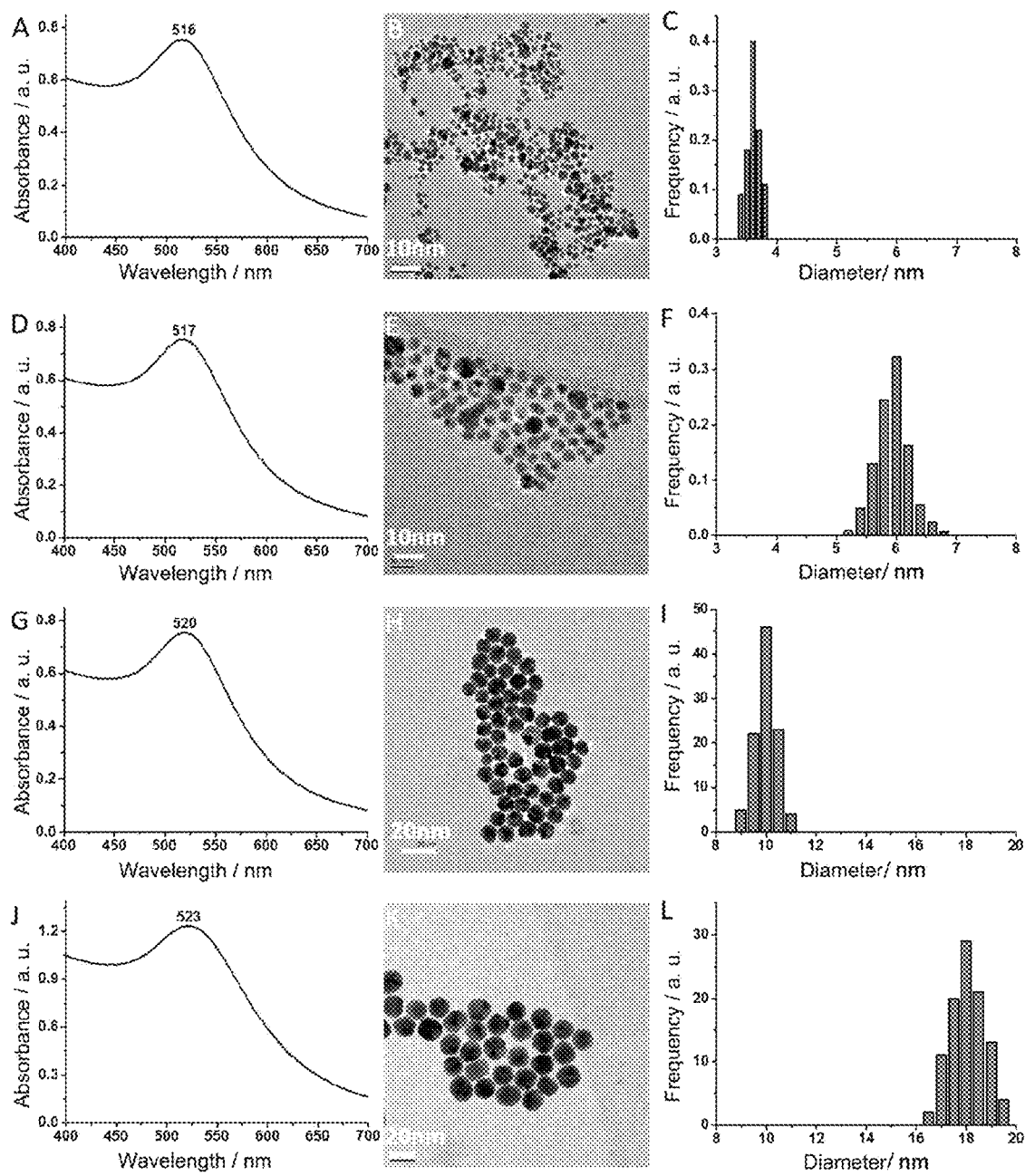
FIG. 1 shows ultraviolet-visible (UV) spectrums, transmission electron microscope (TEM) images and particle size distribution diagrams of ligand L-NIBC-modified gold nanoparticles (L-NIBC-AuNPs) with different particle sizes.

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

As used herein, "administering" means oral ("po") administration, administration as a suppository, topical contact, intravenous ("iv"), intraperitoneal ("ip"), intramuscular ("im"), intralesional, intranasal or subcutaneous ("sc") administration, or the implantation of a slow-release device e.g., a mini-osmotic pump or erodible implant, to a subject. Administration is by any route including parenteral and transmucosal (e.g., oral, nasal, vaginal, rectal, or transdermal). Parenteral administration includes, e.g., intravenous, intramuscular, intra-arteriole, intradermal, subcutaneous, intraperitoneal, intraventricular, and intracranial. Other modes of delivery include, but are not limited to, the use of liposomal formulations, intravenous infusion, transdermal patches, etc.

The terms "systemic administration" and "systemically administered" refer to a method of administering a compound or composition to a mammal so that the compound or composition is delivered to sites in the body, including the targeted site of pharmaceutical action, via the circulatory system. Systemic administration includes, but is not limited to, oral, intranasal, rectal and parenteral (i.e. other than through the alimentary tract, such as intramuscular, intravenous, intra-arterial, transdermal and subcutaneous) administration, with the proviso that, as used herein, systemic administration does not include direct administration to the brain region by means other than via the circulatory system, such as intrathecal injection and intracranial administration.

As used herein, the terms "treating" and "treatment" refer to delaying the onset of, retarding or reversing the progress of, or alleviating or preventing either the disease or condition to which the term applies, or one or more symptoms of such disease or condition. The exemplary index is body weight gain herein. Depending on the patient, the treatment can result in a 5%, 10%, 15%, 20%, 25%, or greater, reduction of weight gain, e.g., in comparison to the weight gain experienced in the same or a different patient, or the average weight gain of a population of patients, receiving the antipsychotic without treatment over the same or a similar time period. In some patients, the treatment can result in reversal of antipsychotic-induced weight gain, that is, can effect weight loss. For example, some patients with treatment can lose 5%, 10%, 15%, 20%, 25%, 50%, 75% or 100% of the antipsychotic-induced weight gain, e.g., returning to a weight maintained before administration of the antipsychotic without treatment.

The terms "patient," "subject" or "individual" interchangeably refers to a mammal, for example, a human or a non-human mammal, including primates (e.g., macaque, pan troglodyte, pongo), a domesticated mammal (e.g., felines, canines), an agricultural mammal (e.g., bovine, ovine, porcine, equine) and a laboratory mammal or rodent (e.g., rattus, murine, lagomorpha, hamster, guinea pig).

The phrase "adverse effects caused by atypical antipsychotics" refers to any of the known adverse effects including obesity characterized by obsessive body weight gain, lipid metabolism disorder, and glucose metabolism disorder. The phrase "antipsychotic-induced weight gain" refers to the side effect of weight gain experienced by patients receiving a therapeutic regiment of an atypical antipsychotic. The atypical antipsychotics include olanzapine, clozapine, risperidone, and quetiapine.

Olanzapine and clozapine are both characterized as non-selective acetylcholine-muscarinic receptor (Ach-M) antagonists.

The chemical designation of olanzapine is 2-methyl-4-(4-methyl-1-piperazinyl)-10H-thieno[2,3-b][1,5]benzodiazepine. The molecular formula is $C_{17}H_{20}N_4S$, which corresponds to a molecular weight of 312.44. Olanzapine is classified as a thienobenzodiazepine. The chemical structure is:

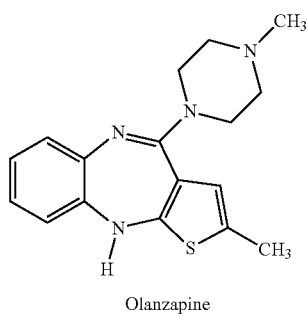 [SMILES: Cc1cc2c(s1)Nc1ccccc1N=C2N1CCN(C)CC1]

Olanzapine

The chemical designation of clozapine is 8-chloro-11-(4-methyl-1-piperazinyl)-5H-dibenzo(b,e)(1,4)diazepine. The molecular formula is $C_{18}H_{19}ClN_4$, which corresponds to a molecular weight of 326.8. The chemical structure is:

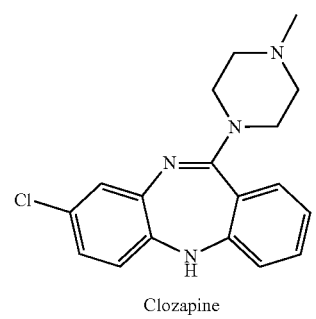 [SMILES: CN1CCN(C2=Nc3cc(Cl)ccc3Nc3ccccc32)CC1]

Clozapine

Gold clusters (AuCs) are a special form of gold existing between gold atoms and gold nanoparticles. AuCs have a size smaller than 3 nm, and are composed of only several to a few hundreds of gold atoms, leading to the collapse of face-centered cubic stacking structure of gold nanoparticles. As a result, AuCs exhibit molecule-like discrete electronic structures with distinct HOMO-LUMO gap unlike the continuous or quasi-continuous energy levels of gold nanoparticles. This leads to the disappearance of surface plasmon resonance effect and the corresponding plasmon resonance absorption band (520±20 nm) at UV-Vis spectrum that possessed by conventional gold nanoparticles.

The present invention provides a ligand-bound AuC.

In certain embodiments, the ligand-bound AuC comprises a ligand and a gold core, wherein the ligand is bound to the gold core. The binding of ligands with gold cores means that ligands form stable-in-solution complexes with gold cores through covalent bond, hydrogen bond, electrostatic force, hydrophobic force, van der Waals force, etc. In certain embodiments, the diameter of the gold core is in the range of 0.5-3 nm. In certain embodiments, the diameter of the gold core is in the range of 0.5-2.6 nm.

In certain embodiments, the ligand of the ligand-bound AuC is a thiol-containing compound or oligopeptide. In certain embodiments, the ligand bonds to the gold core to form a ligand-bonded AuC via Au—S bond.

In certain embodiments, the ligand is, but not limited to, L-cysteine, D-cysteine, or a cysteine derivative. In certain embodiments, the cysteine derivative is N-isobutyryl-L-cysteine (L-NIBC), N-isobutyryl-D-cysteine (D-NIBC), N-acetyl-L-cysteine (L-NAC), or N-acetyl-D-cysteine (D-NAC).

In certain embodiments, the ligand is, but not limited to, a cysteine-containing oligopeptide and its derivatives. In certain embodiments, the cysteine-containing oligopeptide is a cysteine-containing dipeptide. In certain embodiments, the cysteine-containing dipeptide is L(D)-cysteine-L(D)-arginine dipeptide (CR), L(D)-arginine-L(D)-cysteine dipeptide (RC), or L(D)-cysteine-L-histidine dipeptide (CH). In certain embodiments, the cysteine-containing oligopeptide is a cysteine-containing tripeptide. In certain embodiments, the cysteine-containing tripeptide is glycine-L(D)-cysteine-L(D)-arginine tripeptide (GCR), L(D)-proline-L(D)-cysteine-L(D)-arginine tripeptide (PCR), or L(D)-glutathione (GSH). In certain embodiments, the cysteine-containing oligopeptide is a cysteine-containing tetrapeptide. In certain embodiments, the cysteine-containing tetrapeptide is glycine-L(D)-serine-L(D)-cysteine-L(D)-arginine tetrapeptide (GSCR) or glycine-L(D)-cysteine-L(D)-serine-L(D)-arginine tetrapeptide (GCSR).

In certain embodiments, the ligand is a thiol-containing compound. In certain embodiments, thiol-containing compound is 1-[(2S)-2-methyl-3-thiol-1-oxopropyl]-L(D)-proline, thioglycollic acid, mercaptoethanol, thiophenol, D-3-trolovol, dodecyl mercaptan, 2-aminoethanethiol (CSH), 3-mercaptopropionic acid (MPA), or 4-mercaptobenoic acid (p-MBA).

The present invention provides a pharmaceutical composition for the treatment of a subject with adverse effects caused by an atypical antipsychotic including olanzapine, clozapine, risperidone, and quetiapine. In certain embodiments, the subject is human. In certain embodiments, the subject is a pet animal such as a dog.

In certain embodiments, the pharmaceutical composition comprises a ligand-bound AuC as disclosed above and a pharmaceutically acceptable excipient. In certain embodiments, the excipient is phosphate-buffered solution, or physiological saline.

The present invention provides a use of the above disclosed ligand-bound AuCs for manufacturing a medication for the treatment of a subject with adverse effects caused by an atypical antipsychotic including olanzapine, clozapine, risperidone, and quetiapine.

The present invention provides a use of the above disclosed ligand-bound AuCs for treating a subject with adverse effects caused by an atypical antipsychotic including olanzapine, clozapine, risperidone, and quetiapine, or a method for treating a subject with adverse effects caused by an atypical antipsychotic including olanzapine, clozapine, risperidone, and quetiapine using the above disclosed ligand-bound AuCs. In certain embodiments, the method for treatment comprises administering a pharmaceutically effective amount of ligand-bound AuCs to the subject. The pharmaceutically effective amount can be ascertained by routine in vivo studies.

In certain embodiments, the atypical antipsychotic drug and the ligand-bound AuCs can be co-administered. In certain embodiments, the atypical antipsychotic drug and the ligand-bound AuCs can be administered separately by the same or different routes.

The following examples are provided for the sole purpose of illustrating the principles of the present invention; they are by no means intended to limit the scope of the present invention.

EXAMPLES

1. Preparation of Ligand-Bound AuCs
   1.1 Dissolving $HAuCl_4$ in methanol, water, ethanol, n-propanol, or ethyl acetate to get a solution A in which the concentration of $HAuCl_4$ is 0.01~0.03M;
   1.2 Dissolving a ligand in a solvent to get a solution B in which the concentration of the ligand is 0.01~0.18M; the ligand includes, but not limited to, L-cysteine, D-cysteine and other cysteine derivatives such as N-isobutyryl-L-cysteine (L-NIBC), N-isobutyryl-D-cysteine (D-NIBC), N-acetyl-L-cysteine (L-NAC), and N-acetyl-D-cysteine (D-NAC), cysteine-containing oligopeptides and their derivatives including, but not limited to, dipeptides, tripeptide, tetrapeptide and other peptides containing cysteine, such as L(D)-cysteine-L(D)-arginine dipeptide (CR), L(D)-arginine-L(D)-cysteine dipeptide (RC), L(D)-cysteine L(D)-histidine (CH), glycine-L(D)-cysteine-L(D)-arginine tripeptide (GCR), L(D)-proline-L(D)-cysteine-L(D)-arginine tripeptide (PCR), L(D)-glutathione (GSH), glycine-L(D)-serine-L(D)-cysteine-L(D)-arginine tetrapeptide (GSCR) and glycine-L(D)-cysteine-L(D)-serine-L(D)-arginine tetrapeptide (GCSR), and other thiol-containing compounds, such as one or more of 1-[(2S)-2-methyl-3-thiol-1-oxopropyl]-L(D)-proline, thioglycollic acid, mercaptoethanol, thiophenol, D-3-trolovol, dodecyl mercaptan, 2-aminoethanethiol (CSH), 3-mercaptopropionic acid (MPA), and 4-mercaptobenoic acid (p-MBA); the solvent is one or more of methanol, ethyl acetate, water, ethanol, n-propanol, pentane, formic acid, acetic acid, diethyl ether, acetone, anisole, 1-propanol, 2-propanol, 1-butanol, 2-butanol, pentanol, butyl acetate, tributyl methyl ether, isopropyl acetate, dimethyl sulfoxide, ethyl formate, isobutyl acetate, methyl acetate, 2-methyl-1-propanol and propyl acetate;
   1.3 Mixing solution A and solution B so that the mole ratio between $HAuCl_4$ and ligand is 1:(0.01~100), stirring them in an ice bath for 0.1~48 h, adding 0.025~0.8M $NaBH_4$ water, ethanol or methanol solution, continuing to stir in an ice water bath and react for 0.1~12 h. The mole ratio between $NaBH_4$ and ligand is 1:(0.01~100);
   1.4 Using MWCO 3K~30K ultrafiltration tubes to centrifuge the reaction solution at 8000~17500 r/min by gradient for 10~100 min after the reaction ends to obtain ligand-bound AuCs precipitate in different average particle sizes. The aperture of the filtration membranes for ultrafiltration tubes of different MWCOs directly decides the size of ligand-bound AuCs that can pass the membranes. This step may be optionally omitted;
   1.5 Dissolving the ligand-bound AuCs precipitate in different average particle sizes obtained in step (1.4) in water, putting it in a dialysis bag and dialyzing it in water at room temperature for 1~7 days;
   1.6 Freeze-drying ligand-bound AuCs for 12~24 h after dialysis to obtain a powdery or flocculant substance, i.e., ligand-bound AuCs.

As detected, the particle size of the powdery or flocculant substance obtained by the foregoing method is smaller than 3 nm (distributed in 0.5-2.6 nm in general). No obvious absorption peak at 520 nm. It is determined that the obtained powder or floc is ligand-bound AuCs.

2. Preparation and Characterization of AuCs Bound with Different Ligands
   2.1 Preparation of L-NIBC-Bound AuCs, i.e. L-NIBC-AuCs
   Taking ligand L-NIBC for example, the preparation and confirmation of AuCs bound with ligand L-NIBC are detailed.
   2.1.1 Weigh 1.00 g of $HAuCl_4$ and dissolve it in 100 mL of methanol to obtain a 0.03M solution A;
   2.1.2 Weigh 0.57 g of L-NIBC and dissolve it in 100 mL of glacial acetic acid (acetic acid) to obtain a 0.03M solution B;
   2.1.3 Measure 1 mL of solution A, mix it with 0.5 mL, 1 mL, 2 mL, 3 mL, 4 mL, or 5 mL of solution B respectively (i.e. the mole ratio between $HAuCl_4$ and L-NIBC is 1:0.5, 1:1, 1:2, 1:3, 1:4, 1:5 respectively), react in an ice bath under stirring for 2 h, quickly add 1 mL of freshly prepared 0.03M (prepared by weighing 11.3 mg of $NaBH_4$ and dissolving it in 10 mL of ethanol) $NaBH_4$ ethanol solution when the solution turns colorless from bright yellow, continue the reaction for 30 min after the solution turns dark brown, and add 10 mL of acetone to terminate the reaction.
   2.1.4 After the reaction, the reaction solution is subjected to gradient centrifugation to obtain L-NIBC-AuCs powder with different particle sizes. Specific method: After the reaction is completed, the reaction solution is transferred to an ultrafiltration tube with MWCO of 30K and a volume of 50 mL, and centrifuged at 10000 r/min for 20 min, and the retentate in the inner tube is dissolved in ultrapure water to obtain powder with a particle size of about 2.6 nm. Then, the mixed solution in the outer tube is transferred to an ultrafiltration tube with a volume of 50 mL and MWCO of 10K, and centrifuged at 13,000 r/min for 30 min. The retentate in the inner tube is dissolved in ultrapure water to obtain powder with a particle size of about 1.8 nm. Then the mixed solution in the outer tube is transferred to an ultrafiltration tube with a volume of 50 mL and MWCO of 3K, and centrifuged at 17,500 r/min for 40 min. The retentate in the inner tube is dissolved in ultrapure water to obtain powder with a particle size of about 1.1 nm.

2.1.5 Precipitate the powder in three different particle sizes obtained by gradient centrifugation, remove the solvent respectively, blow the crude product dry with $N_2$, dissolve it in 5 mL of ultrapure water, put it in a dialysis bag (MWCO is 3 KDa), put the dialysis bag in 2 L of ultrapure water, change water every other day, dialyze it for 7 days, freeze-dry it and keep it for future use.

2.2 Characterization of L-NIBC-AuCs

Characterization experiment was conducted for the powder obtained above (L-NIBC-AuCs). Meanwhile, ligand L-NIBC-modified gold nanoparticles (L-NIBC-AuNPs) are used as control. The method for preparing gold nanoparticles with ligand being L-NIBC refers to the reference (W. Yan, L. Xu, C. Xu, W. Ma, H. Kuang, L. Wang and N. A. Kotov, Journal of the American Chemical Society 2012, 134, 15114; X. Yuan, B. Zhang, Z. Luo, Q. Yao, D. T. Leong, N. Yan and J. Xie, Angewandte Chemie International Edition 2014, 53, 4623).

2.2.1 Observation of the Morphology by Transmission Electron Microscope (TEM)

The test powders (L-NIBC-AuCs sample and L-NIBC-AuNPs sample) were dissolved in ultrapure water to 2 mg/L as samples, and then test samples were prepared by hanging drop method. More specifically, 5 µL of the samples were dripped on an ultrathin carbon film, volatized naturally till the water drop disappeared, and then observe the morphology of the samples by JEM-2100F STEM/EDS field emission high-resolution TEM.

Figure 2:
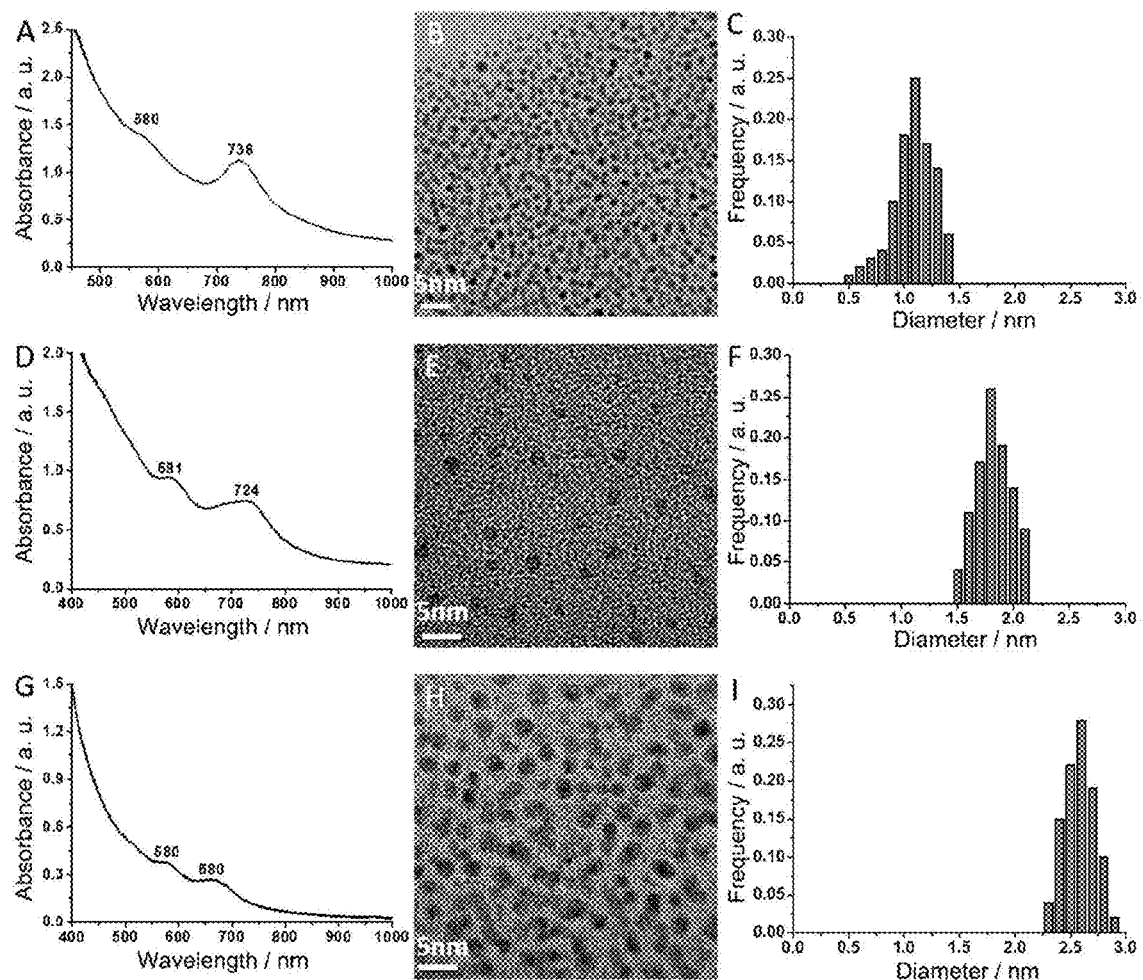
FIG. 2 shows ultraviolet-visible (UV) spectrums, TEM images and particle size distribution diagrams of ligand L-NIBC-bound gold clusters (L-NIBC-AuCs) with different particle sizes.

The four TEM images of L-NIBC-AuNPs are shown in panels B, E, H, and K of FIG. 1; the three TEM images of L-NIBC-AuCs are shown in panels B, E, and H of FIG. 2.

The images in FIG. 2 indicate that each of L-NIBC-AuCs samples has a uniform particle size and good dispersibility, and the average diameter of L-NIBC-AuCs (refer to the diameter of gold core) is 1.1 nm, 1.8 nm and 2.6 nm respectively, in good accordance with the results in panels C, F and I of FIG. 2. In comparison, L-NIBC-AuNPs samples have a larger particle size. Their average diameter (refer to the diameter of gold core) is 3.6 nm, 6.0 nm, 10.1 nm and 18.2 nm respectively, in good accordance with the results in panels C, F, I and L of FIG. 1.

2.2.2 Ultraviolet (UV)-Visible (Vis) Absorption Spectra

The test powders (L-NIBC-AuCs sample and L-NIBC-AuNPs sample) were dissolved in ultrapure water till the concentration was 10 mg·$L^{-1}$, and the UV-vis absorption spectra were measured at room temperature. The scanning range was 190-1100 nm, the sample cell was a standard quartz cuvette with an optical path of 1 cm, and the reference cell was filled with ultrapure water.

The UV-vis absorption spectra of the four L-NIBC-AuNPs samples with different sizes are shown in panels A, D, G and J of FIG. 1, and the statistical distribution of particle size is shown in panels C, F, I and L of FIG. 1; the UV-vis absorption spectra of three L-NIBC-AuCs samples with different sizes are shown in panels A, D and G of FIG. 2, and the statistical distribution of particle size is shown in panels C, F and I of FIG. 2.

FIG. 1 indicates that due to the surface plasmon effect, L-NIBC-AuNPs had an absorption peak at about 520 nm. The position of the absorption peak is relevant with particle size. When the particle size is 3.6 nm, the UV absorption peak appears at 516 nm; when the particle size is 6.0 nm, the UV absorption peak appears at 517 nm; when the particle size is 10.1 nm, the UV absorption peak appears at 520 nm, and when the particle size is 18.2 nm, the absorption peak appears at 523 nm. None of the four samples has any absorption peak above 560 nm.

FIG. 2 indicates that in the UV absorption spectra of three L-NIBC-AuCs samples with different particle sizes, the surface plasmon effect absorption peak at 520 nm disappeared, and two obvious absorption peaks appeared above 560 nm and the positions of the absorption peaks varied slightly with the particle sizes of AuCs. This is because AuCs exhibit molecule-like properties due to the collapse of the face-centered cubic structure, which leads to the discontinuity of the density of states of AuCs, the energy level splitting, the disappearance of plasmon resonance effect and the appearance of a new absorption peak in the long-wave direction. It could be concluded that the three powder samples in different particle sizes obtained above are all ligand-bound AuCs.

2.2.3 Fourier Transform Infrared Spectroscopy

Infrared spectra were measured on a VERTEX80V Fourier transform infrared spectrometer manufactured by Bruker in a solid powder high vacuum total reflection mode. The scanning range is 4000-400 $cm^{-1}$ and the number of scans is 64. Taking L-NIBC-AuCs samples for example, the test samples were L-NIBC-AuCs dry powder with three different particle sizes and the control sample was pure L-NIBC powder. The results are shown in FIG. 3.

Figure 3:
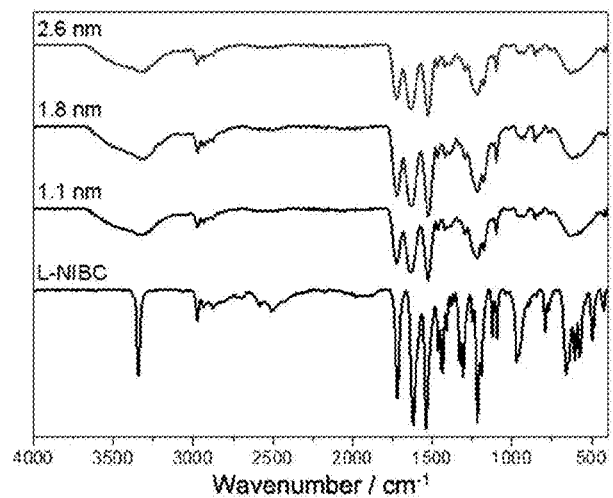
FIG. 3 shows infrared spectra of L-NIBC-AuCs with different particle sizes.

FIG. 3 shows the infrared spectrum of L-NIBC-AuCs with different particle sizes. Compared with pure L-NIBC (the curve at the bottom), the S—H stretching vibrations of L-NIBC-AuCs with different particle sizes all disappeared completely at 2500-2600 $cm^{-1}$, while other characteristic peaks of L-NIBC were still observed, proving that L-NIBC molecules were successfully bound to the surface of AuCs via Au—S bond. The figure also shows that the infrared spectrum of the ligand-bound AuCs is irrelevant with its size.

AuCs bound with other ligands were prepared by a method similar to the above method, except that the solvent of solution B, the feed ratio between $HAuCl_4$ and ligand, the reaction time and the amount of $NaBH_4$ added were slightly adjusted. For example: when L-cysteine, D-cysteine, N-isobutyryl-L-cysteine (L-NIBC) or N-isobutyryl-D-cysteine (D-NIBC) is used as the ligand, acetic acid is selected as the solvent; when dipeptide CR, dipeptide RC or 1-[(2S)-2-methyl-3-thiol-1-oxopropyl]-L-proline is used as the ligand, water is selected as the solvent, and so on and so forth; other steps are similar, so no further details are provided herein.

The present invention prepared and obtained a series of ligand-bound AuCs by the foregoing method. The ligands and the parameters of the preparation process are shown in Table 1.

TABLE 1

Preparation parameters of AuCs bound with different ligands in the present invention

| | Ligand | Solvent used for solution B | Feed ratio between HAuCl$_4$ and ligand | Time of reaction in an ice bath under stirring before addition of NaBH$_4$ | Mole ratio between HAuCl$_4$ and NaBH$_4$ | Time of reaction in an ice bath under stirring after addition of NaBH$_4$ |
|---|---|---|---|---|---|---|
| 1 | L-cysteine | Acetic acid | 1:3 | 2 h | 1:2 | 0.5 h |
| 2 | D-cysteine | Acetic acid | 1:3 | 2 h | 1:2 | 0.5 h |
| 3 | N-acetyl-L-cysteine | Ethanol | 1:4 | 1 h | 1:1 | 0.5 h |
| 4 | N-acetyl-D-cysteine | Ethanol | 1:4 | 1 h | 1:1 | 0.5 h |
| 5 | L-NIBC | Water | 1:4 | 0.5 h | 1:2 | 0.5 h |
| 6 | D-NIBC | Water | 1:4 | 0.5 h | 1:2 | 0.5 h |
| 7 | Other cysteine derivatives | Soluble solvent | 1:(0.1~100) | 0.5 h~24 h | 1:(0.1~100) | 0.1~24 h |
| 8 | CR | Water | 1:4 | 22 h | 2:1 | 0.5 h |
| 9 | RC | Water | 1:4 | 20 h | 2:1 | 0.5 h |
| 10 | HC | Water | 1:3 | 12 h | 1:2 | 2 h |
| 11 | CH | Ethanol | 1:4 | 16 h | 1:3 | 3 h |
| 12 | GSH | Water | 1:2 | 12 h | 1:1 | 3 h |
| 13 | KCP | Water | 1:3 | 15 h | 1:2 | 1 h |
| 14 | PCR | Water | 1:4 | 16 h | 1:3 | 2 h |
| 15 | GSCR | Water | 1:4 | 16 h | 1:3 | 1.5 h |
| 16 | GCSR | Water | 1:3 | 12 h | 1:2 | 2 h |
| 17 | Other oligopeptides containing cysteine | Soluble solvent | 1:(0.1~100) | 0.5 h~24 h | 1:(0.1~100) | 0.1~24 h |
| 18 | 1-[(2S)-2-methyl-3-thiol-1-oxopropyl]-L-proline | Water | 1:8 | 2 h | 1:7 | 1 h |
| 19 | Mercaptoethanol | Ethanol | 1:2 | 2 h | 1:1 | 1 h |
| 20 | Thioglycollic acid | Acetic acid | 1:2 | 2 h | 1:1 | 1 h |
| 21 | Thiophenol | Ethanol | 1:5 | 5 h | 1:1 | 1 h |
| 22 | D-3-trolovol | Water | 1:2 | 2 h | 1:1 | 1 h |
| 23 | N-(2-mercaptopropionyl)-glycine | Water | 1:2 | 2 h | 1:1 | 1 h |
| 24 | Dodecyl mercaptan | Methanol | 1:5 | 5 h | 1:1 | 1 h |
| 25 | 2-aminoethanethiol (CSH) | Water | 1:5 | 2 h | 8:1 | 0.5 h |
| 26 | 3-mercaptopropionic acid (MPA) | Water | 1:2 | 1 h | 5:1 | 0.5 h |
| 27 | 4-mercaptobenoic acid (p-MBA) | Water | 1:6 | 0.5 h | 3:1 | 2 h |
| 28 | Other compounds containing thiol | Soluble solvent | 1:(0.01~100) | 0.5 h~24 h | 1:(0.1~100) | 0.1~24 h |

Figure 4:
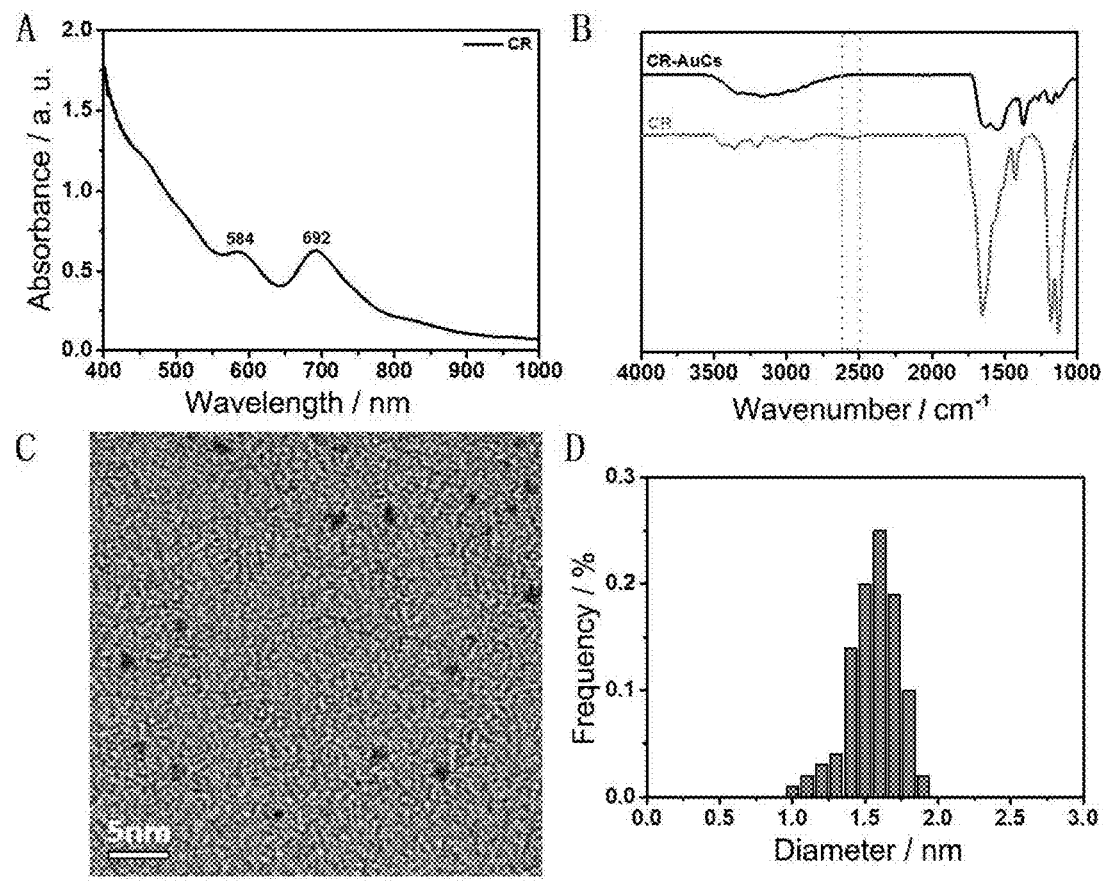
FIG. 4 shows UV, infrared, TEM, and particle size distribution diagrams of ligand CR-bound gold clusters (CR-AuCs).
Figure 5:
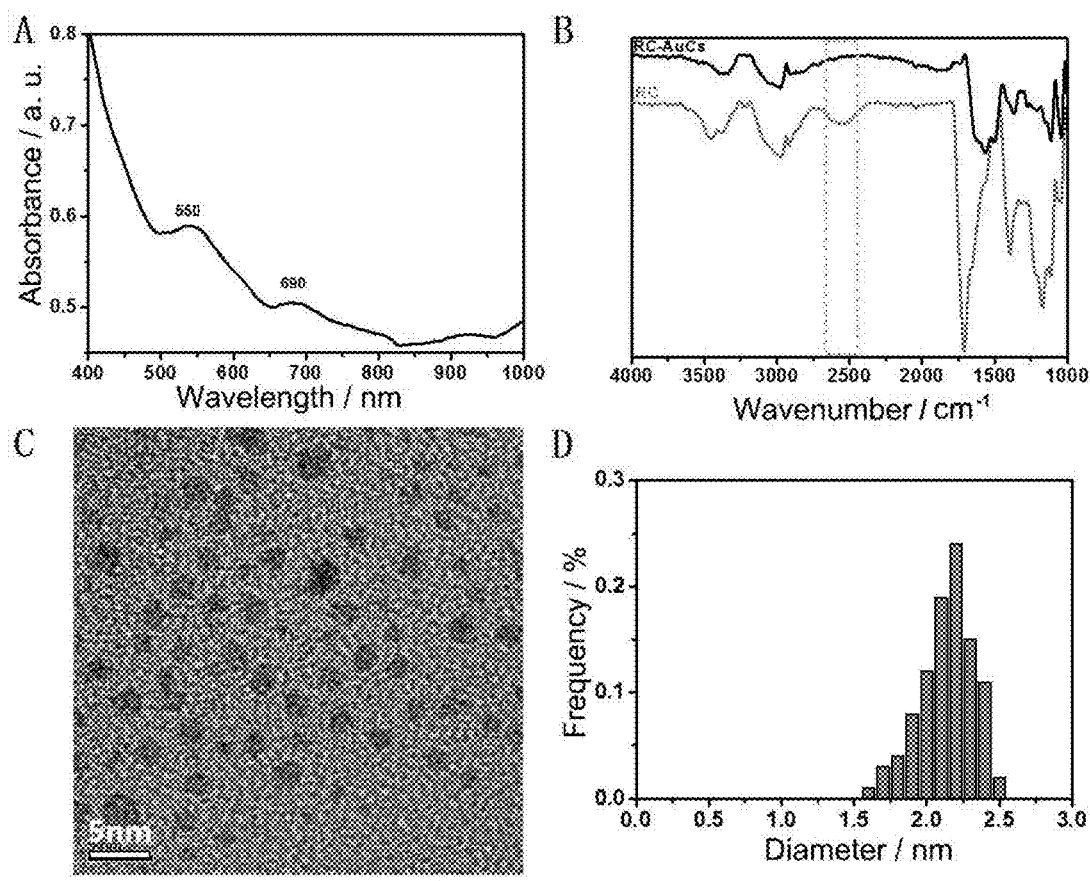
FIG. 5 shows UV, infrared, TEM, and particle size distribution diagrams of ligand RC-bound gold clusters (RC-AuCs).
Figure 6:
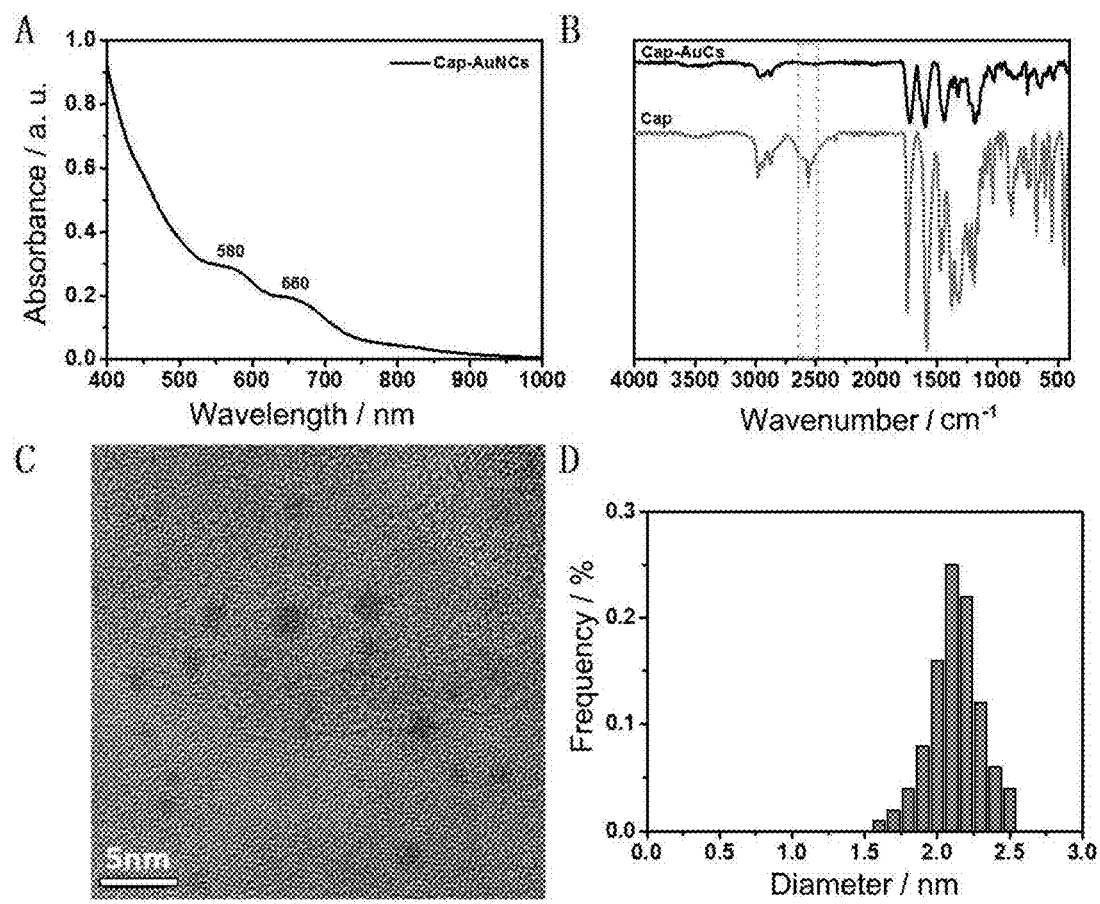
FIG. 6 shows UV, infrared, TEM, and particle size distribution diagrams of ligand 1-[(2S)-2-methyl-3-thiol-1-oxopropyl]-L-proline (i.e., Cap)-bound gold clusters (Cap-AuCs).
Figure 7:
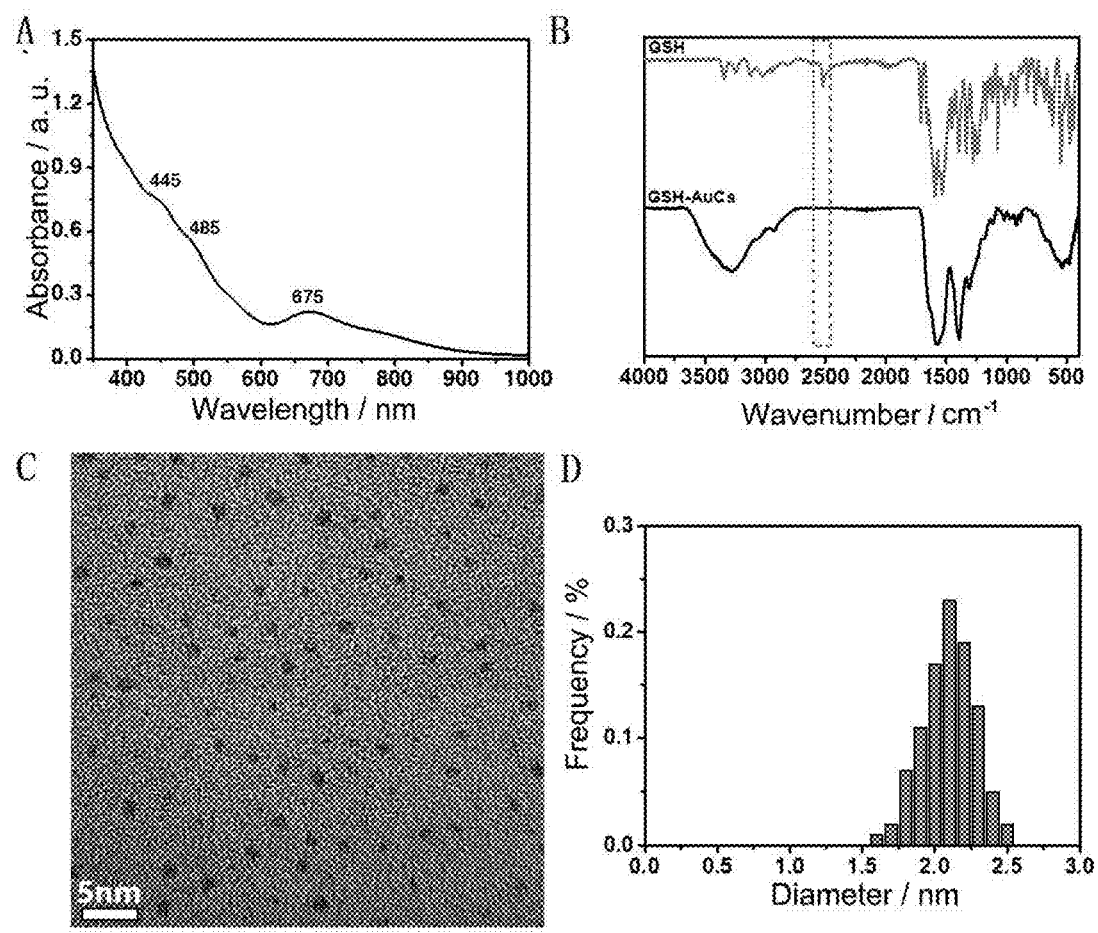
FIG. 7 shows UV, infrared, TEM, and particle size distribution diagrams of ligand GSH-bound gold clusters (GSH-AuCs).
Figure 8:
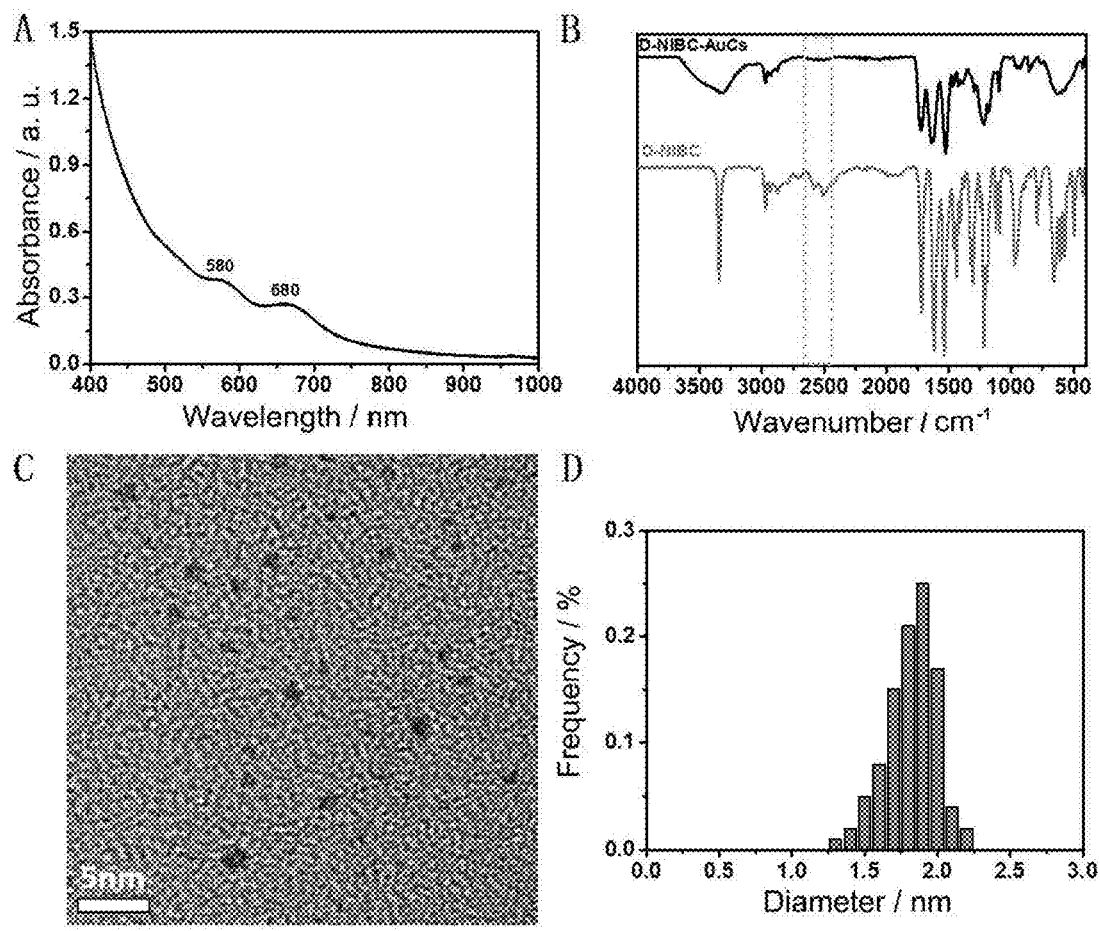
FIG. 8 shows UV, infrared, TEM, and particle size distribution diagrams of ligand D-NIBC-bound gold clusters (D-NIBC-AuCs).
Figure 9:
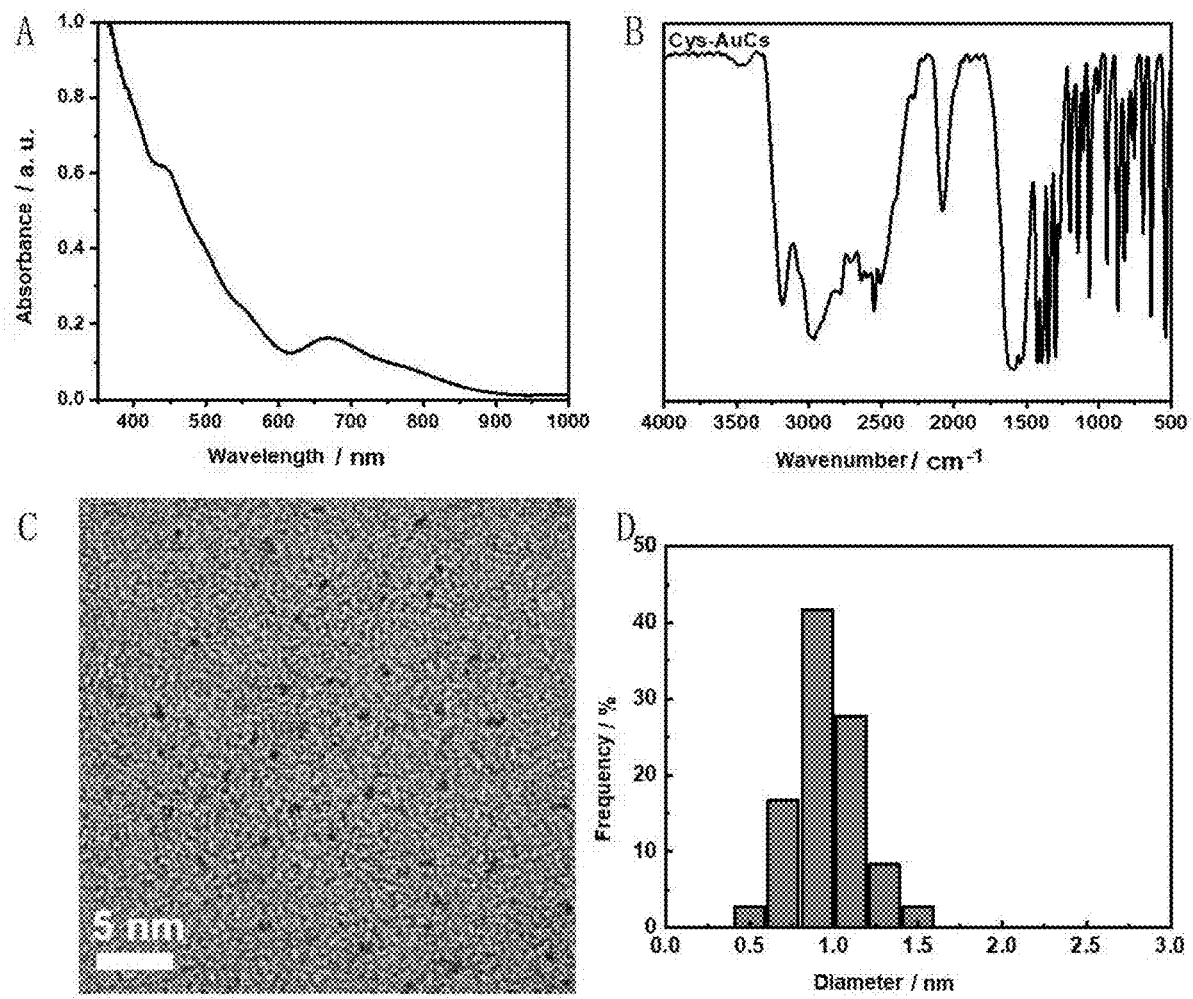
FIG. 9 shows UV, infrared, TEM, and particle size distribution diagrams of ligand L-cysteine-bound gold clusters (L-Cys-AuCs).
Figure 10:
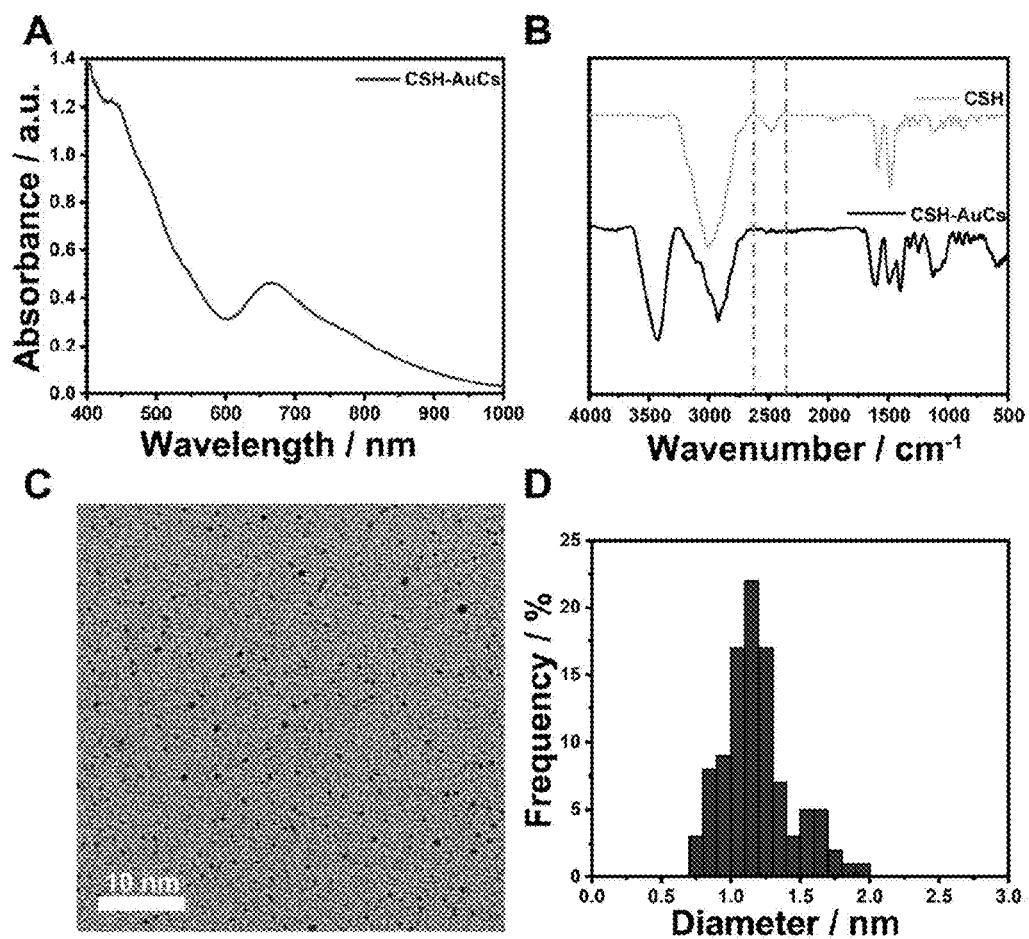
FIG. 10 shows UV, infrared, TEM, and particle size distribution diagrams of ligand 2-aminoethanethiol-bound gold clusters (CSH-AuCs).
Figure 11:
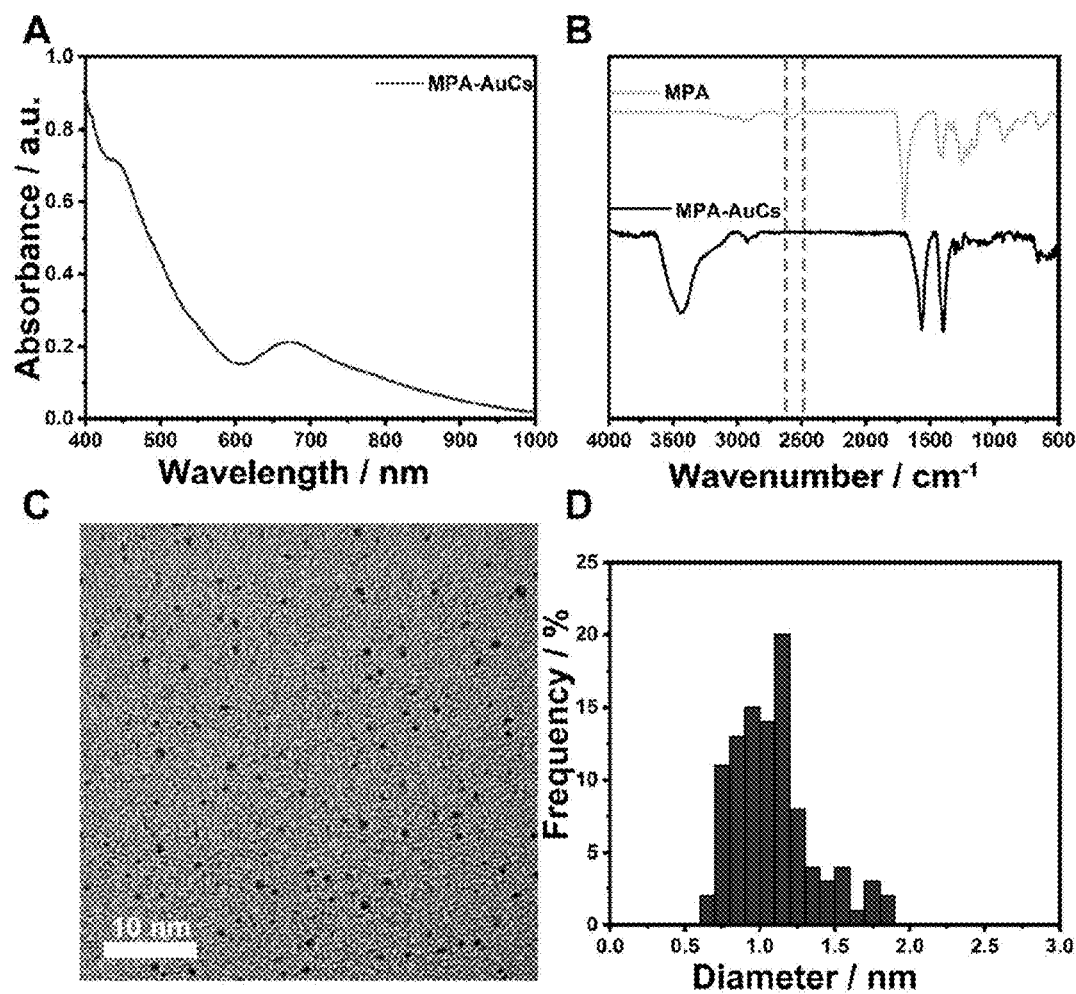
FIG. 11 shows UV, infrared, TEM, and particle size distribution diagrams of ligand 3-mercaptopropionic acid-bound gold clusters (MPA-AuCs).
Figure 12:
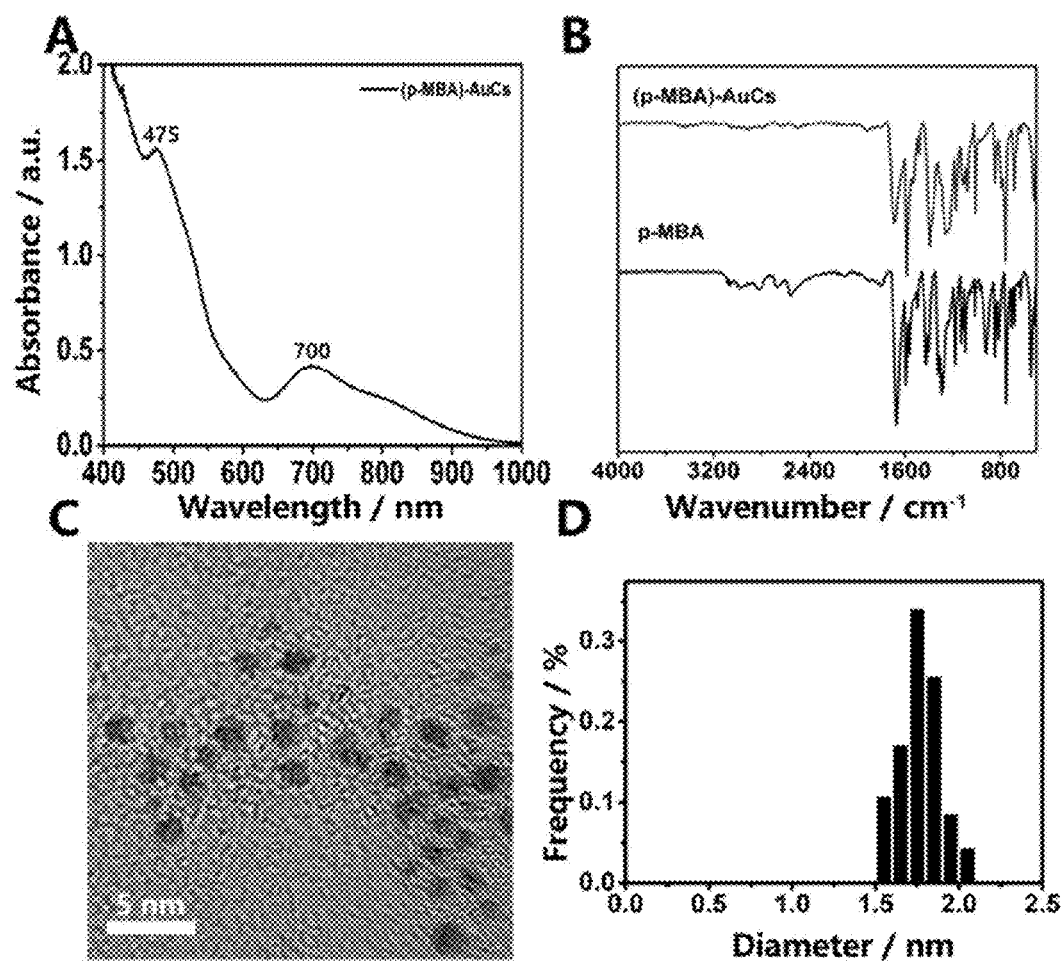
FIG. 12 shows UV, infrared, TEM, and particle size distribution diagrams of ligand 4-mercaptobenoic acid-bound gold clusters (p-MBA-AuCs).

The samples listed in Table 1 are confirmed by the foregoing methods. The characteristics of nine different ligand-bound AuCs are shown in FIG. 4 (CR-AuCs), in FIG. 5 (RC-AuCs), in FIG. 6 (Cap-AuCs) (Cap denotes 1-[(2S)-2-methyl-3-thiol-1-oxopropyl]-L-proline), in FIG. 7 (GSH-AuCs), in FIG. 8 (D-NIBC-AuCs), in FIG. 9 (L-Cys-AuCs), in FIG. 10 (CSH-AuCs), in FIG. 11 (MPA-AuCs), and in FIG. 12 (p-MBA-AuCs). FIG. 4-FIG. 12 show UV spectra (panel A), infrared spectra (panel B), TEM images (panel C), and particle size distribution (panel D).

The results indicate that the diameters of AuCs bound with different ligands obtained from Table 1 are all smaller than 3 nm. Ultraviolet spectra also show disappearance of peak at 520±20 nm, and appearance of absorption peak in other positions. The position of the absorption peak could vary with ligands and particle sizes as well as structures. In certain situations, there is no special absorption peak, mainly due to the formation of AuCs mixtures with different particles sizes and structures or certain special AuCs that moves the position of absorption peak beyond the range of UV-vis spectrum. Meanwhile, Fourier transform infrared spectra also show the disappearance of ligand thiol infrared absorption peak (between the dotted lines in panel B of FIGS. 4-8), while other infrared characteristic peaks are all retained, suggesting that all ligand molecules have been successfully bound to gold atoms to form ligand-bound AuCs, and the present invention has successfully obtained AuCs bound with the ligands listed in Table 1.

3. Animal Studies
3.1 Testing Samples
A1: ligand L-NIBC-bound gold clusters (L-NIBC-AuCs), size distribution in the range of 0.5-3 nm.
A2: ligand N-acetyl-L-cysteine-bound gold clusters (L-NAC-AuCs), size distribution in the range of 0.5-3 nm.
A3: ligand L-cysteine-bound gold clusters (L-Cys-AuCs), size distribution in the range of 0.5-3 nm.
A4: ligand 2-aminoethanethiol-bound gold clusters (CSH-AuCs), size distribution in the range of 0.5-3 nm.
A5: ligand 3-mercaptopropionic acid-bound gold clusters (MPA-AuCs), size distribution in the range of 0.5-3 nm.
A6: ligand 4-mercaptobenoic acid-bound gold clusters (p-MBA-AuCs), size distribution in the range of 0.5-3 nm.
B: L-NIBC-bound gold nanoparticles (L-NIBC-AuNPs), size distribution range 5-9 nm.

All testing samples were prepared following the above described method with slight modification, and their quality was characterized using the above described methods.

3.2 Establishment of Olanzapine-Induced Adverse Effects Model and Exploration of the Inhibitory Effect of Different Ligand-Bound AuCs on Olanzapine-Induced Weight Gain and the Dosage Effect One hundred and forty-four (144) SPF female Sprague Dawley rats (8-10 weeks) were purchased from the Experimental Animal Center of SiPeifu (Beijing) Biotechnology Co., Ltd. All rats were kept in a barrier environment, the temperature was controlled at 22±2° C., and the interval between day and night was 12 hours, 7: 00-19:00 as day, and 19: 00-7:00 the next day as night. After one week of adaptive feeding, the rats were randomly divided into 12 groups (n=12/group), making sure that the average body weight and food intake of each group of rats were nearly the same): negative control groups (CON, group 1)), Olanzapine model control group (OLZ, group 2), Olanzapine+A1 high-dose group (OLZ+A1H, group 3), Olanzapine+A1 low-dose group (OLZ+A1L, group 4), Olanzapine+A2 high-dose group (OLZ+A2H, group 5), Olanzapine+A2 low-dose group (OLZ+A2L, group 6), Olanzapine+A3 high-dose group (OLZ+A3H, group 7), Olanzapine+A3 low-dose group (OLZ+A3L, group 8), Olanzapine+A4 high-dose group (OLZ+A4H, group 9), Olanzapine+A5 high-dose group (OLZ+A5H, group 10), Olanzapine+A6 high-dose group (OLZ+A6H, group 11), and Olanzapine+B high-dose group (OLZ+B, group 12). Groups 2-12 rats were given orally olanzapine (1 mg/kg, tid (ter in die), administration time points: 7:00, 15:00, and 23:00), and the negative control group (group 1) was given an equal amount of placebo served as a control, where olanzapine was orally administered to rats in a pellet made of 0.3 g of food (mixed with 24.3% casein, 34.3% corn starch, 34.36% sucrose, and 6.98% gelatin). Placebo is an equivalent amount of olanzapine-free food pills. From the first day of olanzapine (or placebo) administration, the olanzapine+drug high-dose groups were intraperitoneally injected with drug A1, A2, A3, A4, A5, A6 or B (20 mg/kg, once a day), and olanzapine+ drug low-dose groups were injected intraperitoneally with drug A1, A2 or A3 (10 mg/kg, once a day). The negative control group and the olanzapine model control group were given by intraperitoneal injection of the same amount of physiological saline as a control. The same mode of administration was performed for 21 successive days. Animal feeding was measured every 24 h, and animal weight was measured every 48 h to observe the inhibitory effect of different doses of AuCs on olanzapine-induced weight gains.

3.3 Glucose Tolerance Test

On the 21st day of administration, all rats were fasted for 16 h. Blood samples were collected from the tail vein of rats, and the fasting blood glucose value (0 h) of the rats was measured with a blood glucose meter (Johnson & Johnson One Touch Ultra, Johnson & Johnson (China) Medical Equipment Co., Ltd.), and the corresponding dose of glucose solution was injected intraperitoneally (1 g/kg), the blood glucose values were measured 30 minutes, 60 minutes, 90 minutes, and 120 minutes after administration of the glucose solution, and the area under the curve (AUC) of each mouse was calculated.

3.4 Rat Euthanasia and Tissue Collection

After the last administration, the rats were anesthetized with 7% chloral hydrate. After blood samples were collected from the heart, the liver, mesenteric, perirenal, and periovary tissues were collected, weighed and stored at −80° C.

3.5 Data Statistics and Analysis

Statistical analysis was performed on all data using SPSS 22.0 statistical software. All data are expressed as mean±SEM, and the statistical difference is defined as $P<0.05$.

3.6 Experimental Results 3.6.1 Administration of Gold Cluster Drug Significantly Reduced the Rat Weight Gain and Food Intake Caused by Olanzapine Table 2 shows the body weight changes of the rats in negative control group, olanzapine model control group, high- and low-dose groups of three AuCs (A1, A2 and A3), and AuNP high-dose group. As shown in Table 2, the initial body weights (IBW) of all groups of rats were nearly the same (245.48 g-247.86 g). After 21 day of drug administration, the final body weight (FBW) of the olanzapine model control group was significantly higher than that of the negative control group ($P<0.01$), indicating that the model was successfully established. Compared with the olanzapine model control group, the weights of the high-dose gold cluster drug groups (OLZ+A1H, OLZ+A2H and OLZ+ A3H) were significantly lower (both $P<0.05$), and the weights of the low-dose gold cluster drug groups (OLZ+ A1L, OLZ+A2L and OLZ+A3L) were apparently lower. At the same time, compared with the negative control group, the final body weight gain (BWG, i.e. the difference between the final body weight and the initial body weight) of the olanzapine model control group was extremely significantly increased ($P<0.01$); compared with the olanzapine model control group, the final body weight gains (BGW) of the high-dose gold cluster drug groups (OLZ+A1H, OLZ+ A2Hand OLZ+A3H) were extremely significantly reduced (both $P<0.01$), and the final body weight gains (BGW) of the low-dose gold cluster drug groups (OLZ+A1L, OLZ+A2L and OLZ+A3L) were also significantly reduced (both $P<0.05$). The other three high dose gold cluster drug groups (OLZ+A4H, OLZ+A5H, and OLZ+A6H) showed similar results. However, compared with the olanzapine model control group, the final body weight (FBW) and final body weight gain (BGW) of the high-dose gold nanoparticle drug group (OLZ+B) were not significantly decreased ($P>0.05$).

TABLE 2

Effects of different drug administrations on rat body weight gain caused by olanzapine

| | BodyWeight (g) | | |
| --- | --- | --- | --- |
| | IBW | FBW | BWG |
| CON | 246.29 ± 5.06 | 282.10 ± 5.88 | 35.81 ± 2.73 |
| OLZ | 247.86 ± 3.66 | 298.33 ± 4.97 | 50.46 ± 3.52** |
| OLZ + A1H | 246.94 ± 4.02 | 279.54 ± 2.47# | 32.59 ± 3.42## |
| OLZ + A1L | 245.89 ± 3.8 | 281.50 ± 6.24 | 35.61 ± 4.41# |
| OLZ + A2H | 245.91 ± 5.54 | 277.18 ± 3.16# | 31.28 ± 4.11## |
| OLZ + A2L | 247.85 ± 3.72 | 282.74 ± 6.46 | 34.89 ± 2.97# |
| OLZ + A3H | 246.71 ± 5.25 | 276.54 ± 4.19# | 29.83 ± 4.27## |
| OLZ + A3L | 245.48 ± 4.76 | 283.04 ± 6.58 | 37.56 ± 4.85# |
| OLZ + B | 246.19 ± 4.26 | 292.59 ± 5.12 | 46.40 ± 3.72 |

In Table 2, IBW: initial body weight; FBW: final body weight; BWG: body weight gain; CON: negative control group; OLZ: olanzapine model control group; OLZ+A1H: OLZ+A1 high-dose administration group; OLZ+A1L: OLZ+A1 low-dose administration group; OLZ+A2H: OLZ+A2 high-dose administration group; OLZ+A2L: OLZ+A2 low-dose administration group; OLZ+A3H: OLZ+A3 high-dose administration group; OLZ+A3L: OLZ+A3 low-dose administration group; OLZ+B: OLZ+B high-dose administration group; *: P<0.05, OLZ vs. CON; **: P<0.01, OLZ vs. CON; #: P<0.05, each administration group vs. OLZ; ##: P<0.01, each administration group vs. OLZ.

3.6.2 Gold Cluster Drug Administration Significantly Reduced the Olanzapine-Induced Increase of Mesenteric Fat Olanzapine-induced weight gain can lead to fatty liver. Table 3 shows the changes of the liver weight and mesenteric fat of the rats in negative control group, olanzapine model control group, high- and low-dose groups of three AuCs (A1, A2 and A3), and AuNP high-dose group. As shown in Table 3, compared with the negative control group, the olanzapine model control group increased liver weight, but there was no significant difference (P>0.05). Compared with the olanzapine model control group, the different dose groups of the three gold cluster drugs can reduce liver weight, and the low-dose group of A1 and high-dose group of A3 showed a significant difference (P<0.05). Among the peripheral fats, compared with the negative control group, the olanzapine model control group significantly increased the accumulation of intestinal fat (P<0.05). Compared with the olanzapine model control group, both high and low doses of A1, A2 and A3 showed a dose-dependent reduction in the increase in olanzapine-induced peri-intestinal fat (the highest weight loss ratio was as high as 32%). The other three high dose gold cluster drug groups (OLZ+A4H, OLZ+A5H, and OLZ+A6H) showed similar results. In summary, the gold cluster drugs can evidently reduce the fat increase caused by olanzapine, and show a certain dose dependence. However, gold nanoparticle high-dose group showed no significant change, indicating that gold nanoparticles are ineffective.

TABLE 3

Effect of the drugs on rat liver and peri-intestinal fat weight

| | Weight (g) | |
| --- | --- | --- |
| | Liver | Mesenteric |
| CON | 8.05 ± 0.20 | 1.84 ± 0.19 |
| OLZ | 8.76 ± 0.28 | 2.45 ± 0.11* |
| OLZ + A1H | 8.43 ± 0.19 | 1.66 ± 0.16## |
| OLZ + A1L | 7.77 ± 0.18# | 1.93 ± 0.11# |
| OLZ + A2H | 8.30 ± 0.16 | 1.77 ± 0.20## |
| ALZ + A2L | 8.13 ± 0.21 | 1.89 ± 0.14# |
| ALZ + A3H | 7.86 ± 0.24# | 1.68 ± 0.15## |
| ALZ + A3L | 8.25 ± 0.20 | 1.86 ± 0.17# |
| ALZ + B | 8.85 ± 0.30 | 2.39 ± 0.15 |

In Table 3, CON: negative control group; OLZ: olanzapine model control group; OLZ+A1H: OLZ+A1 high-dose administration group; OLZ+A1L: OLZ+A1 low-dose administration group; OLZ+A2H: OLZ+A2 high-dose administration group; OLZ+A2L: OLZ+A2 low-dose administration group; OLZ+A3H: OLZ+A3 high-dose administration group; OLZ+A3L: OLZ+A3 low-dose administration group; OLZ+B: OLZ+B high-dose administration group; *: P<0.05, OLZ vs. CON; #: P<0.05, each administration group vs. OLZ; ##: P<0.01, each administration group vs. OLZ.

Figure 13:
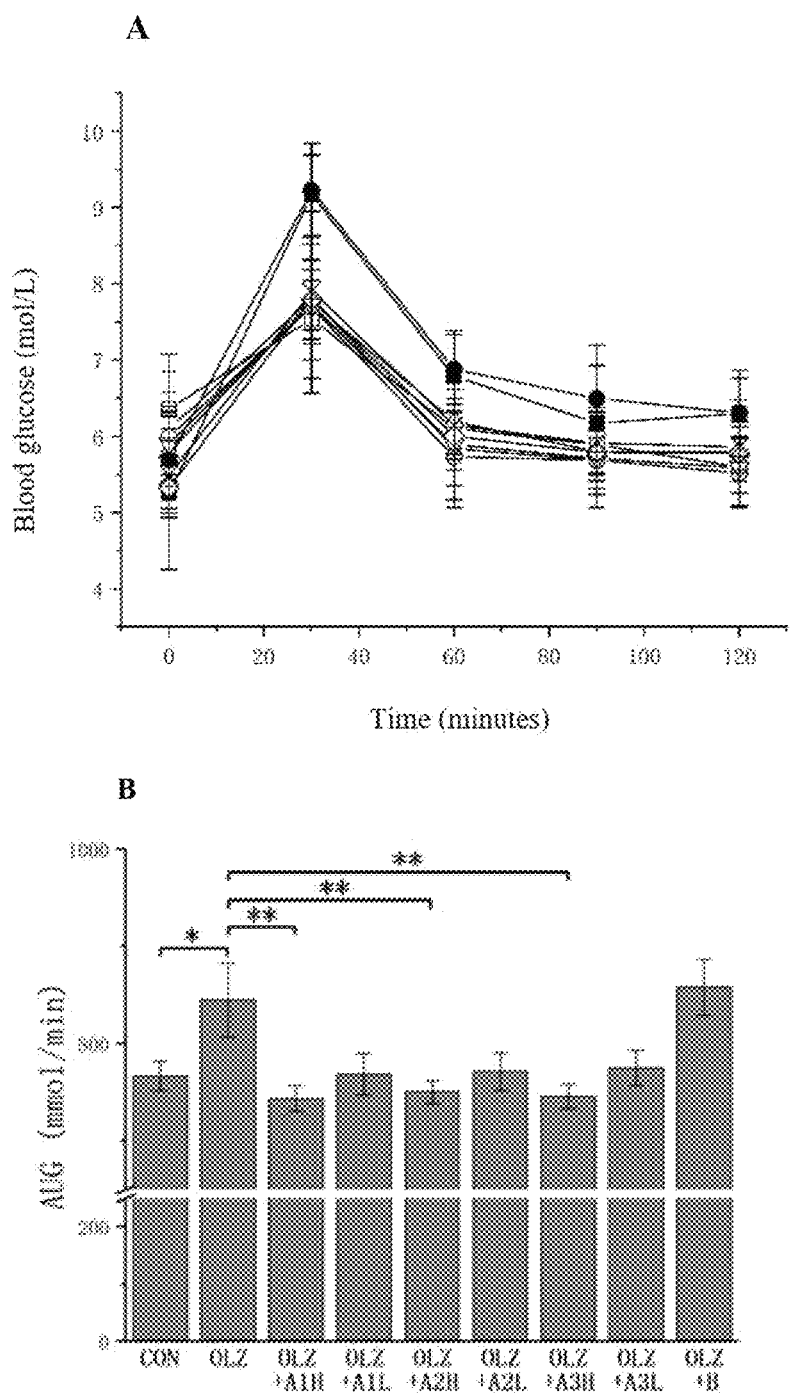
FIG. 13 presents (A) blood glucose metabolism curves and (B) area under the blood glucose curve (AUG) in each group of rats. CON: negative control group; OLZ: olanzapine model control group; OLZ+A1H: OLZ+A1 high-dose administration group; OLZ+A1L: OLZ+A1 low-dose administration group; OLZ+A2H: OLZ+A2 high-dose administration group; OLZ+A2L: OLZ+A2 low-dose administration group; OLZ+A3H: OLZ+A3 high-dose administration group; OLZ+A3L: OLZ+A3 low-dose administration group; OLZ+B: OLA+B high-dose administration group; *: P<0.05; **: P<0.01.

3.6.3 Gold Cluster Drug Administration Significantly Reduced the Blood Glucose Increase Caused by Olanzapine Clinically, olanzapine administration can lead to elevated blood glucose and diabetes. FIG. 13 shows the blood glucose metabolism curves and area under the blood glucose curve (AUG) of the rats in negative control group, olanzapine model control group, high- and low-dose groups of three AuCs (A1, A2 and A3), and AuNP high-dose group.

This study found that the olanzapine model control group and the different administration groups did not significantly affect fasting blood glucose (P>0.05). However, compared with the negative control group, after the glucose injection, the blood glucose level of the olanzapine model control group rats significantly increased at 30 minutes (P<0.01) and 120 minutes (P<0.05) after the intraperitoneal glucose injection, from 7.54±0.26 mmol/L and 6.11±0.12 mmol/L were increased to 9.16±0.48 mmol/L and 6.79±0.32 mmol/L, respectively (FIG. 13A). The area under the blood glucose curve (AUG) increased significantly from 766.83±15.05 mmol/min to 845.07±37.88 mmol/min (P<0.05, FIG. 13B). The above results indicate the significant effect of olanzapine administration on animal glucose metabolism disorder.

Compared with the olanzapine model control group, the blood glucose levels of the groups of three gold cluster drugs (A1, A2 and A3) were significantly reduced, especially in the high-dose groups. The blood glucose levels of the rats in the three high-dose groups significantly decreased at 30 minutes (both P<0.01), 60 minutes (both P<0.01), and 120 minutes (both P<0.01) after the glucose injection, and the blood glucose levels were close to that of the negative control group (FIG. 13A). Taking A1 as an example, the blood glucose values at these three time points decreased from 9.16±0.48 mmol/L, 6.79±0.32 mmol/L, and 6.30±0.33 mmol/L of the olanzapine model control group to 7.7±0.15 mmol/L, 5.74±0.18 mmol/L and 5.53±0.14 mmol/L respectively (FIG. 13A). In addition, the area under the blood glucose curve (AUG) of the three high-dose gold cluster drugs was also significantly lower than that of the olanzapine model control group (both P<0.01, FIG. 13B). Taking A1 (OLZ+A1H) as an example, the AUG value decreased from 845.07±37.88 mmol/min in the olanzapine model control group (OLZ) to 743.50±13.04 mmol/min. The blood glucose of rats in the three low-dose gold cluster drugs also decreased evidently at different time points, but both showed significant differences only at 30 minutes (P<0.05). The other three high dose gold cluster drug groups (OLZ+A4H, OLZ+A5H, and OLZ+A6H) showed similar results. This shows that gold cluster drugs can improve the blood glucose metabolism disorder caused by olanzapine in a dose-dependent manner.

However, the administration of gold nanoparticles (B) did not significantly decrease the blood glucose concentration (FIG. 13A) or the area under the blood glucose curve (AUG) (FIG. 13B) at different time periods. Therefore, it has no improvement effect on the blood glucose metabolism disorder caused by olanzapine.

In summary, long-term administration of gold clusters can significantly reduce the weight gain and fat increase caused by olanzapine, and significantly improve the lipid and glucose metabolism disorders caused by olanzapine, which provides the basis for later research and development of gold clusters as medications to reduce the second generation anti-psychotic drugs-induced adverse effects. However, gold nanoparticles have no such effects, and cannot be used as drugs for treating olanzapine-caused obesity.

Other sized L-Cys-AuCs, L-NAC-AuCs, L-NIBC-AuCs, CSH-AuCs, MPA-AuCs, and p-MBA-AuCs, and other ligand-bound AuCs with different sizes also have the similar effects, while their effects vary to certain extents. They would not be described in detail here.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the scope of the present invention. Accordingly, the scope of the present invention is defined by the appended claims and is supported by the foregoing description.

The invention claimed is:

1. A method for treating adverse effects caused by an atypical antipsychotic in a subject, wherein the method comprises:
    administering a composition to the subject with adverse effects caused by the atypical antipsychotic, wherein the adverse effects caused by the atypical antipsychotic are selected from the group consisting of obesity characterized by excessive body weight gain, lipid metabolism disorder, and glucose metabolism disorder;
    wherein the composition comprises a ligand-bound gold cluster; and
    a pharmaceutically acceptable excipient;
    wherein the ligand-bound gold cluster comprises:
        a gold core; and
        a ligand bound to the gold core;
    wherein the gold core has a diameter in the range of 0.5-3 nm.

2. The method of claim 1, wherein the ligand is one selected from the group consisting of L-cysteine and its derivatives, D-cysteine and its derivatives, cysteine-containing oligopeptides and their derivatives, and other thiol-containing compounds.

3. The method of claim 2, wherein the L-cysteine and its derivatives are selected from the group consisting of L-cysteine, N-isobutyryl-L-cysteine (L-NIBC), and N-acetyl-L-cysteine (L-NAC), and wherein the D-cysteine and its derivatives are selected from the group consisting of D-cysteine, N-isobutyryl-D-cysteine (D-NIBC), and N-acetyl-D-cysteine (D-NAC).

4. The method of claim 2, wherein the cysteine-containing oligopeptides and their derivatives are cysteine-containing dipeptides, cysteine-containing tripeptides or cysteine-containing tetrapeptides.

5. The method of claim 4, wherein the cysteine-containing dipeptides are selected from the group consisting of L(D)-cysteine-L(D)-arginine dipeptide (CR), L(D)-arginine-L(D)-cysteine dipeptide (RC), L(D)-histidine-L(D)-cysteine dipeptide (HC), and L(D)-cysteine-L(D)-histidine dipeptide (CH).

6. The method of claim 4, wherein the cysteine-containing tripeptides are selected from the group consisting of glycine-L(D)-cysteine-L(D)-arginine tripeptide (GCR), L(D)-proline-L(D)-cysteine-L(D)-arginine tripeptide (PCR), L(D)-lysine-L(D)-cysteine-L(D)-proline tripeptide (KCP), and L(D)-glutathione (GSH).

7. The method of claim 4, wherein the cysteine-containing tetrapeptides are selected from the group consisting of glycine-L(D)-serine-L(D)-cysteine-L(D)-arginine tetrapeptide (GSCR), and glycine-L(D)-cysteine-L(D)-serine-L(D)-arginine tetrapeptide (GCSR).

8. The method of claim 2, wherein the other thiol-containing compounds are selected from the group consisting of 1-[(2S)-2-methyl-3-thiol-1-oxopropyl]-L(D)-proline, thioglycollic acid, mercaptoethanol, thiophenol, D-3-trolovol, N-(2-mercaptopropionyl)-glycine, dodecyl mercaptan, 2-aminoethanethiol (CSH), 3-mercaptopropionic acid (MPA), and 4-mercaptobenoic acid (p-MBA).

9. The method of claim 1, wherein the atypical antipsychotic is one selected from the group consisting of olanzapine, clozapine, risperidone, and quetiapine.

* * * * *